Sept. 2, 1969          G. McARTHUR, JR          3,465,125
               COOKING OVEN CLEANING APPARATUS
Filed Oct. 10, 1966                      5 Sheets-Sheet 1

INVENTOR.
GEORGE Mc ARTHUR JR.
BY
Cox and Sheridan
ATTORNEYS

Sept. 2, 1969  G. McARTHUR, JR  3,465,125
COOKING OVEN CLEANING APPARATUS
Filed Oct. 10, 1966  5 Sheets-Sheet 2

*INVENTOR.*
GEORGE Mc ARTHUR JR.
BY

Cox and Sheridan
ATTORNEYS

Sept. 2, 1969  G. McARTHUR, JR  3,465,125
COOKING OVEN CLEANING APPARATUS
Filed Oct. 10, 1966  5 Sheets-Sheet 3

INVENTOR.
GEORGE Mc ARTHUR JR.
BY
Cox and Sheridan
ATTORNEYS

INVENTOR.
GEORGE Mc ARTHUR JR
BY
Cox and Sheridan
ATTORNEYS

United States Patent Office 3,465,125
Patented Sept. 2, 1969

3,465,125
COOKING OVEN CLEANING APPARATUS
George McArthur, Jr., Delaware, Ohio, assignor, by mesne assignments, to Glenwood Range Company, Taunton, Mass., a corporation of Massachusetts
Filed Oct. 10, 1966, Ser. No. 585,596
Int. Cl. F27d *11/10;* A21b *1/02;* F24b *7/00*
U.S. Cl. 219—406                                    6 Claims

ABSTRACT OF THE DISCLOSURE

A cooking oven apparatus for cleaning grease and other deposits from an oven liner and more particularly relates to a cleaning method wherein the liner is raised to cleaning temperature by supplying heat directly to the liner from heating units which are affixed to or are a part of the oven liner, and a heating unit apparatus in which a portion of the oven liner serves as an integral part of the heating unit in a manner to increase the efficiency of heat conduction to and through the oven liner and in a manner to permit an improved process for manufacturing an oven liner by forming the liner after the heating units are placed thereon.

---

Background

The electric or gas range, used for domestic cooking, is a familiar household appliance and usually includes an oven for broiling and baking. Such ovens are usually bounded by metal at the rear, sides, top, and bottom, which metal forms the "oven liner." A door is releasably positioned to complete the enclosure of the oven. Heat for electric ovens is most often supplied by electric resistance elements positioned wholly within the oven cavity. Heat transfer from such elements to the food and to the oven liner occurs partly by radiation, partly by convection currents of air within the oven, and partly by conduction through the air within the oven.

Other inventors have suggested cleaning an oven liner by heating the liner to a "cleaning temperature." Such a "cleaning temperature" must be high enough to cause degradation, evaporation, and oxidation of the products of cooking which become deposited on the oven liner. This cleaning temperature may for some products be above 750° F. while for others it may be at or below 750° F. The patent to B. Ames No. 2,224,945 and the patent to B. Hurko No. 3,121,158 disclose cleaning methods for cleaning an oven liner by supplying heat to the oven from heating elements positioned within the oven cavity. Heat transfer for cleaning purposes occurs by the three means stated above for heating units so positioned. The heat transfer path in cleaning methods has heretofore included substantial air. Air is undesirable because of its high thermal resistance.

Because of this inefficient heat transfer, prior heat cleaning methods require approximately an hour to raise the oven liner temperature to cleaning temperature. Prior methods of cleaning take the oven out of service for a length of time which is inconvenient for a consumer.

While "self cleaning" electric ovens are becoming commercially available to consumers, a "self cleaning" gas oven is not. Feasible gas burner cleaning structures have not been introduced nor have other "self cleaning" means been introduced.

Other inventors have disclosed heating units attached to oven liner walls for use in cooking. S. Ottenstein, Patent No. 2,035,757 shows such units. In manufacturing an oven having such units attached thereto, it is customary to produce the liner and the heating units separately. The heating units are, as a last step, attached to the liner. If it is desired to make a liner with heating units conforming to a curved portion of the liner, the liner is formed in an operation separate from the forming of the heating units. After each is separately formed, they are then attached together. This method would be particularly difficult if an oven with heating units completely surrounding the liner were desired.

Heating units attached to an oven liner for cooking purposes supply heat which is conducted directly to the oven liner so that the oven liner becomes the source of heat for the oven and its contents. The type of heating unit which has been attached to an oven liner has been a generally tubular structure comprising (1) a "sheath," usually a metal tube; (2) an electrical resistance element positioned within the sheath; and (3) an insulating material which substantially fills the sheath and, although conducting heat, electrically insulates the sheath from the electrical resistance element.

This structure, although representing an advance in the art, falls short of the demand for a heating unit capable of heating the oven liner to cleaning temperature and capable of being assembled in a facile manner.

Objects

It is therefore an object of my invention to provide a new and useful method for cleaning an oven.

A further object of my invention is to provide an oven cleaning process wherein the oven liner is directly heated to cleaning temperature without the necessity of raising the air within the oven cavity to cleaning temperature.

A further object of my invention is to provide an oven cleaning process which can be integrated into the warm-up cycle of the oven and can be performed concurrently with the oven warm-up which occurs during each normal use of the oven.

A further object of my invention is to provide a heating unit for use with an oven cleaning process which heating unit is constructed so that air is substantially eliminated from the heat transfer path from the heat source to the oven liner and efficiency is thereby increased.

A further object of my invention is to provide an oven heating unit, the manufacture of which can be effectively integrated with the manufacture of the oven liner.

A still further object of my invention is to provide an oven liner manufacturing process for simultaneously forming the oven liner and the heating units attached thereto.

A further object of my invention is to provide a cleaning process and heating unit for use therewith which may be used to clean gas ovens.

I have found that the foregoing objects can be attained by a method of cleaning an oven liner having heating units attached thereto, said method comprising supplying heat from said heating units to said oven liner, sufficient to elevate the liner temperature to a temperature above 750° F., whereby some accumulated food soils are degraded, others are evaporated, and others are oxidized.

The foregoing objects can be attained by a method of manufacturing an oven liner which comprises the steps of first attaching to a sheet of metal a plurality of spaced parallel channel members in a manner so that a plurality of spaced longitudinally extending cavities is formed; second, inserting an electric resistance element into said cavity; third, putting an electrically insulating heat conducting material into each of said cavities into intimate contact with the resistance element therein and into intimate contact with the walls bounding the cavity; and fourth, bending the resulting assembly to form an oven liner.

The foregoing objects can be attained by a method similar to the method immediately above except that the channel member is attached after the electrical resistance and the electrically insulating heat conducting material are inserted in the channel member.

The foregoing objects may be further attained by an oven-heating unit comprising: a portion of an oven liner; a channel member attached to said liner portion in a manner to form a cavity between said channel member and said liner portion; an electric resistance element for the supplying of heat, said element positioned within said cavity; and an electrically-insulating heat conducting material intimately surrounding said resistance element and making a substantial area of contact with said liner portion whereby a substantial proportion of the heat flowing from said resistance element to said liner passes through said area.

Further objects and features of my invention will be apparent from the following specification and claims when considered in connection with the accompanying drawings illustrating several embodiments of my invention.

Description

Figures 1, 2:
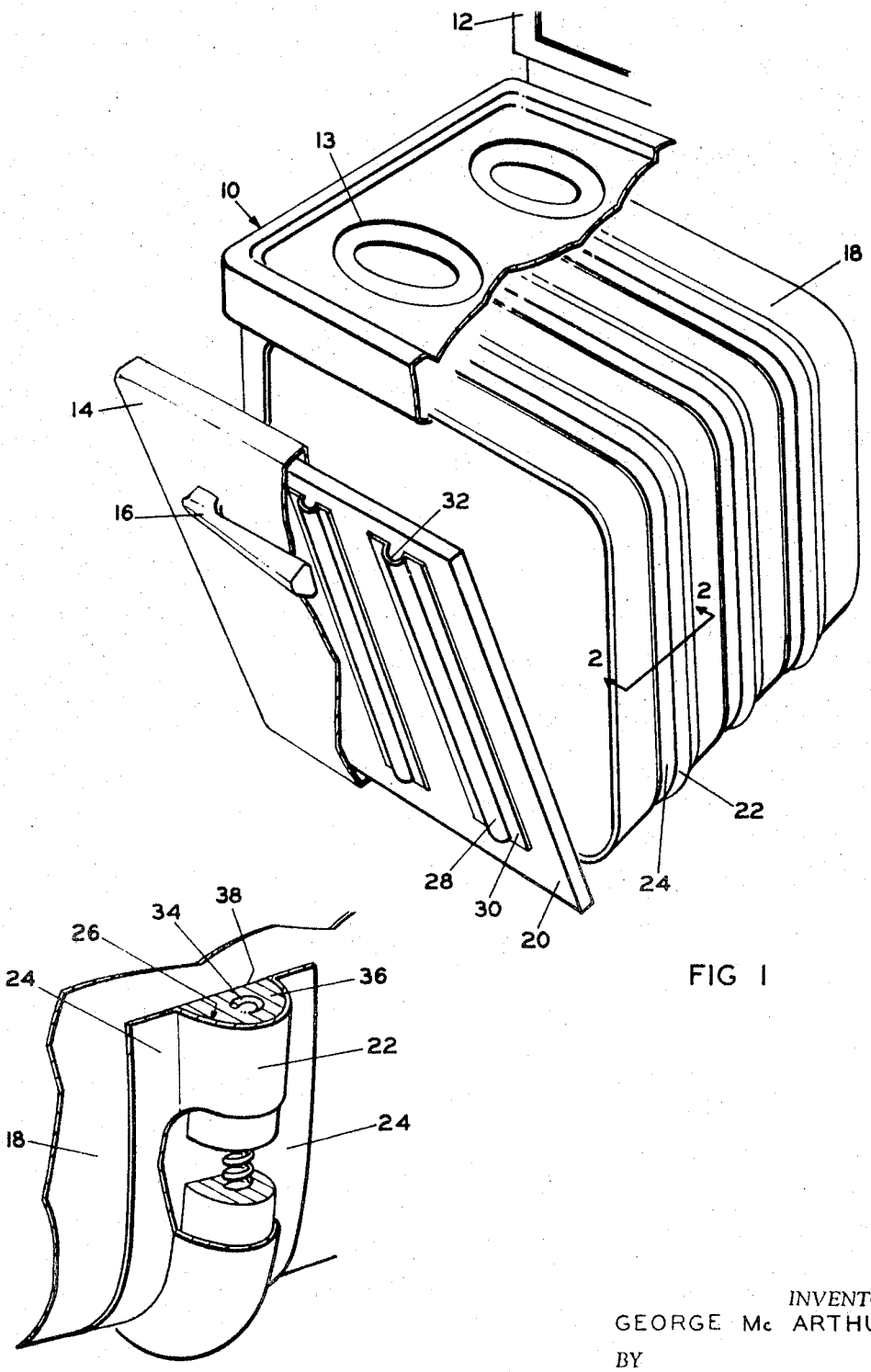
FIG. 1 is a fragmentary view in perspective of a range, portions of the range being cut away to show the oven liner, said oven liner being adapted for oven cleaning according to my invention.
FIG. 2 is a fragmentary view in perspective of a heating unit constructed according to my invention, taken substantially along the line and arrows 2—2 of FIG. 1.

Referring more specifically to the drawings, FIG. 1 shows a range 10 with a backsplash 12, burners 13, an oven door 14 partly open, a door handle 16, and an oven defined by a back liner, not shown, an oven liner 18 for the top, bottom, and sides, and by door 20. Heating units are formed on the oven liner by means of channel members such as channel member 22. The channel members are provided with flanges, such as flange 24, which provide means for attaching the channel members to the oven liner 18 by any desired means, such as welding. Similarly, channel members such as channel member 28 are provided with flanges 30 and are attached to the door liner 20 to form heating units on the door liner.

The heating unit structure of my invention or a structure known in the art may be used to perform my cleaning process. However, a structure according to my invention has been found to be more efficient and is discussed later in detail.

The heating units shown in FIG. 1 may be conventionally connected to a source of electrical power so they may be simultaneously energized, or each or several of them may be separately controlled.

One embodiment of my heat cleaning process may be illustrated by first assuming that the oven liner has deposited thereon greases and other soil subject to evaporation or degradation at various temperatures.

To clean such an oven liner, sufficient electrical power is supplied to the heating units to bring the heating unit temperature above the heat cleaning temperature. A temperature of 750° is sufficient. Heat flows directly to the oven liner and through the liner to those portions of the liner between the heating units. All portions of the liner are raised in temperature above cleaning temperature. The grease and other soils evaporate and degrade and may be transmitted out of the oven by suitable means. I have found that within five minutes the temperatures of the liner adjacent to the heating units will reach 850° F. while between the heating units it will reach 800° F.

Due to the remarkably fast heating of the oven liner with my invention, yet another embodiment of my heat cleaning process is possible. My process makes it unnecessary to heat the air within the oven cavity. The air may be below the heat cleaning temperature while the oven liner is at cleaning temperature. Therefore, the heat cleaning process may be integrated into the "warm up" of the oven prior to cooking.

Thus, following the use of an oven wherein grease has been deposited on the walls of the oven, a subsequent baking operation is begun as follows: the heat is turned on and each of the heating units comes to a high temperature; heat flows from the resistance elements to the insulating material and then to the oven liner in a manner described below. In this manner, the whole oven liner, including that portion between the heating units, can be brought to a temperature above 750° F. quite rapidly and before the air temperature in the oven has risen to cooking temperature. Thus, by the time the air temperature in the oven has risen to a cooking temperature; that is, the temperature at which the oven thermostat turns off or turns down the electric current; the oven liner has been at a "cleaning temperature" a period of time sufficient to remove deposited grease. In subsequent heating cycles during cooking, however, the air temperature remains at approximately cooking temperature and the oven liner does not become so hot before the thermostat is activated.

It will be apparent that cleaning in the manner described does not permit grease deposits to accumulate over repeated uses of the oven and hence the limited deposits of grease resulting from a single use are easily removed during the warm-up cycle of a subsequent use of the oven.

Figure 11:
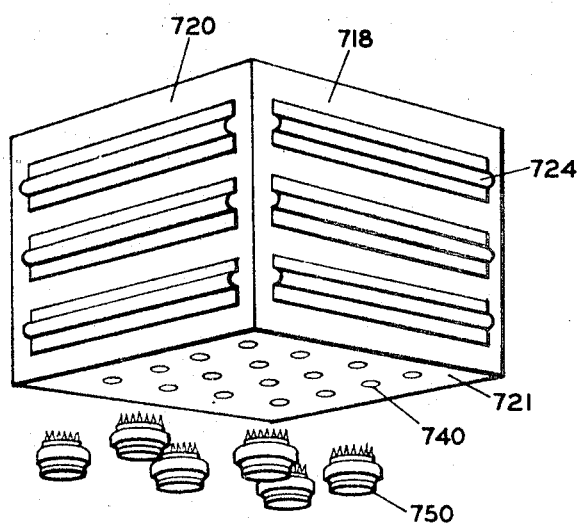
FIG. 11 is a view in perspective of a side, rear, and bottom of a gas range embodiment of my invention.

FIG. 11 illustrates an embodiment of my invention for use with a gas range. FIG. 11 shows one side 718, the rear 720, and the bottom 721 of an oven liner. Both sides, the rear, the top, and the door of the oven have heating units such as unit 724 constructed according to one of the several embodiments of my invention and attached to them as described below. However, the bottom 721 of the oven liner has a plurality of holes 740. Gas burners, such as burner 750, are supported below these holes in any manner desired.

Electrical heating units attached to the oven liner of a gas range as illustrated in FIG. 11 may be used to clean the gas oven in a manner similar to the process already described in this application.

Normally, cooking heat is provided solely by gas flame although heat from the electrical heating units could supplement the gas heat. For cleaning purposes, the electrical heating units may be energized alone, or their heat may be supplemented by heat from the gas flame. In order to clean the oven liner of a gas oven, the heating units are electrically energized and the walls are cleaned as described above. Because a high voltage is usually not available to the user of a gas range, the electrical circuit may be modified. I have found it advantageous to energize the heating units on only one wall at any one time. A single pole multiple throw electrical switch may be used to sequentially energize each surface of the oven liner until all surfaces have been cleaned. A timing device may be attached to this electrical switch. This timer positions the switch to energize the heating units on one surface of the oven liner for a length of time sufficient to clean that surface. The timing device then moves the position of the switch to energize the heating units of another oven liner surface. This continues until all surfaces have been cleaned. The process may be performed either by heating units surrounding the gas oven similarly to FIG. 1 or by separate units which are each on the separate surfaces of the liner.

It will be apparent to those skilled in the art that, as in prior practice, effective heat insulation must be used outside the oven liner-heating unit structure described in order that heat not be unduly dissipated in directions away from the oven. Due to the short time during which the heating units will be at the cleaning temperature, it is unnecessary to circulate air around the oven liner to prevent heating of the range's outer surfaces.

Similarly, and as is well known, one may provide means for controlled air flow through the oven particularly during the period of removal of grease and soil decomposition products. The customary gravity air vent is sufficient under ordinary use. Similarly, and as is well known, provisions can be made for the oxidation of decomposed organic products before they are exhausted from the oven. Under ordinary use this is unnecessary.

Figure 3:
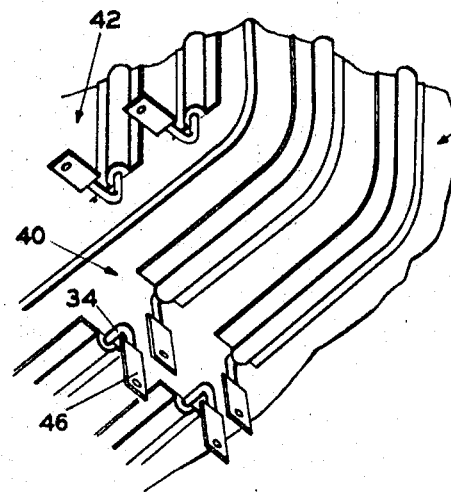
FIG. 3 is a view in perspective of portions of the bottom, side, and rear of an oven liner with heating units constructed according to another embodiment of my invention.

In FIGS. 1–3, I have illustrated heating units which surround substantially the entire periphery of the oven liner. I have found this the preferable construction for use with my cleaning process.

FIG. 3 shows more detail of this preferred embodiment. FIG. 3 shows a portion of the bottom (indicated generally by 40), the rear (indicated generally by 42), and a side (indicated generally by 44) of the oven liner shown in FIG. 1. As shown, a terminal plate 46 is welded to each of the extended and bent ends of the electrical resistance elements 34 of my heating unit. A suitable source (not shown) of electrical power may be connected to the terminal plates 46. In a similar manner, the ends of the electrical resistance elements and the terminal plates may alternatively be positioned at the top (or at one side) of the oven liner instead of at the bottom.

As an alternative embodiment of the invention, I can provide relatively shorter, and straight, heating units each of which is attached to but one wall of the oven. This embodiment is illustrated in FIG. 4, and for the gas oven in FIG. 11.

Figure 4:
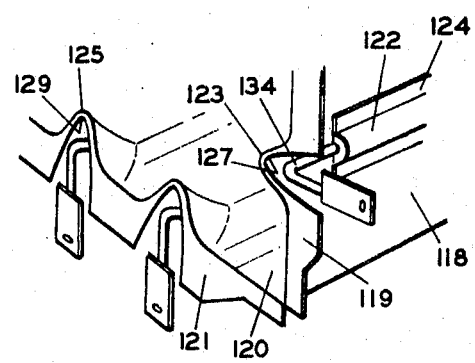
FIG. 4 is a view in perspective of the bottom and side of an oven liner constructed according to another embodiment of my invention.

In FIG. 4 a side wall of oven liner 118 is provided with a flange 119, and the bottom wall 120 is provided with a flange 121. A straight channel member 122, provided with flanges 124, terminates before it reaches the end of the wall 118. A resistance element 134 is positioned within the channel member 122. The side wall 118 is dented inwardly, as at 123, and the bottom wall 120 is dented upwardly, as at 125, opposite notch 127 and notch 129 respectively in the flanges 119 and 121. The latter "notch" and "dent" structure provides strength to the oven structure and permits of insertion of the resistance element 134 into the channel member 122.

Alternatively, the flanges on the side walls could be inwardly bent flanges and the flanges on the bottom could be upwardly bent. This construction would eleminate the need for the notches because the flanges would not then interfere with the insertion of the electrical resistance elements into the cavities.

Figure 5:
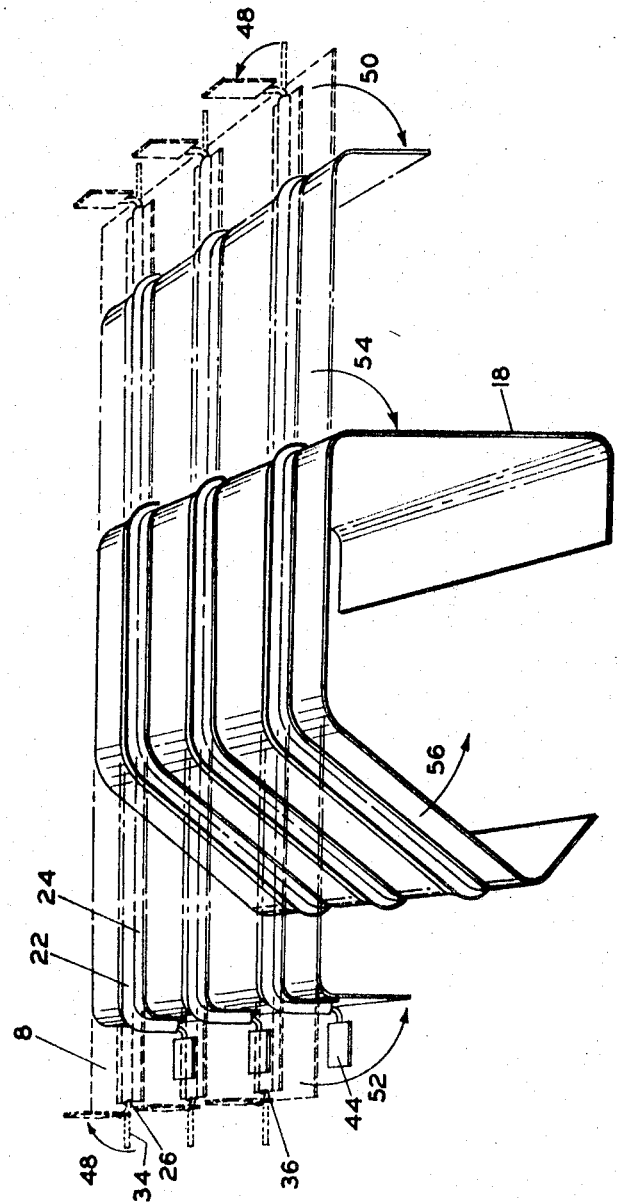
FIG. 5 is a view in perspective shown partially in phantom, for the purpose of illustrating the steps in my process for the forming of an oven liner.

FIG. 5, partly in phantom, is provided to illustrate the steps in my novel process for manufacturing an oven liner-heating unit structure (such as is shown in FIGS. 1–3, for example).

The process begins with an approximately rectangular, planar sheet of metal which is to become the oven liner 18. To this planar sheet a plurality of channel members 22 with flanges 24 are welded. A resistance element 34 is then inserted into each of the cavities 26. The ends of the resistance element 34 bearing the connecting tabs 44 may then be bent at a 90° angle by making the bending movement indicated by the arrow 48.

Alternatively, the resistance elements 34 may be laid on the metal sheet before the channel members 22 are attached to the sheet. Similarly, the terminal plates 44 may be attached to the resistance element before or after the latter has been positioned in the cavity 26.

The insulating material 36, shown best in FIG. 2, is then poured into the cavity while the resistance element 34 is held away from the liner 18.

Both the resistance element and the insulating material may be inserted in the channels before the channel members are attached to the sheet.

The planar sheet; with its accompanying channel members, resistance elements, and insulating material in place; is given a first 90° bend on the right side (as shown in FIG. 5), the bend being indicated by the arrow 50 (or alternatively, the left side). Similarly, the sheet is bent on the left side, this latter bend being indicated by the arrow 52 (or alternatively after being bent on the left side is bent on the right side, or alternatively the sheet is bent on both the right and left side simultaneously). The sheet is next bent through 90° on the right side as indicated by the arrow 54 and is bent through 90° on the left side as indicated by the arrow 56.

Figure 6:
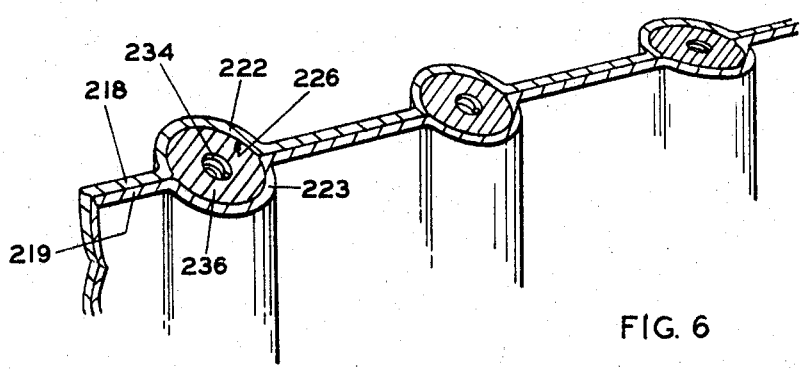
FIG. 6 is a fragmentary view in perspective of another embodiment of my invention.

In producing an oven liner-heating unit such as is shown in FIG. 6, and described in detail later, I first form spaced parallel hemicylindrical channels (222 and 223) in two planar sheets of metal (218 and 219) and then lay one sheet on the other to bring pairs of channels into juxtaposition such that cylindrical cavities, such as cavity 226, are formed. The balance of the operation is as described above; the resistance elements and insulation being put in place, the bending of the sheet, etc.

In a manner essentially the same as the process described above, oven liners may be constructed incorporating any of the other heating units described above and shown in FIGS. 7 through 10.

The fact that the oven liner-heating unit structure of my invention is easily bendable as described below leads to considerable savings in manufacturing costs. Prior art heating units appear to lack the property of easy bendability because of the presence therein of solid tubular metal sheaths and of solid, rigid ceramic insulators.

Furthermore, if prior art heating units were bent simultaneously with the oven liner, they would become spaced from the oven liner at the bend. However, because the electrical insulating material of my invention is in direct contact with the oven liner rather than separated therefrom by another metallic body, contact is maintained at the bend.

Although some prior heating units attached to the oven liner walls may be used to perform my cleaning process, I have invented an improved heating unit which more efficiently cleans and which facilitates the performance of my manufacturing process.

Because of the limitations of space, details of the heating unit construction of the invention are not shown in FIG. 1. These however, are shown in FIG. 2 in cooperation with structures shown in FIG. 1. Thus, I have shown in FIG. 2 a portion of the oven liner 18 and a portion of a channel member 22 with flanges 24. The channel member 22 is attached to the oven liner 18 to form cavity 26. An electric resistance element 34 is a helix and is positioned longitudinally with the cavity 26. An electrically insulating material 36 serves to insulate the resistance element 34 from the channel member 22 and the oven liner 18. The insulating material 36 contacts the oven liner 18 over a substantial area at the interface 38 and intimately surrounds the resistance element 34.

It should be noted that a portion of the liner 18 is, as shown in FIG. 2, a portion of the "sheath" making up the heating unit.

As shown in FIG. 1, the channel members 22 and 28 are attached to the outside wall of the liner. Although this is preferred, the channel members may be attached to the inside wall of the liner. Further, and although the door liner 20 has been identified separately from the liner 18, the door liner 20 may be considered in a sense a part of the oven liner 18.

It is a feature of the heating unit constructed as illustrated (referring to FIG. 2 by way of example) that there is a substantial area of contact (interface 38) between the insulating material 36 and the oven liner 18. Thus, a substantial proportion of the heat flowing from the resistance element 34 to the liner 18 will flow past this area of contact, and no amount of such heat is conducted through any layer of air. In prior art structures, wherein the cylindrical metal sheath of a heating unit is positioned against the metal wall of the oven liner, the area of contact of the sheath and the oven liner is limited to little more if any than a line contact. A minor proportion of the heat flow from the electrical resistance element to the oven liner passes through the contact area. In this latter instance a significant proportion of such heat passes through an air layer between the sheath and the oven liner with resulting inefficiency.

FIG. 6 shows yet another embodiment of my invention. In this embodiment the oven liner comprises a lamina of two layers of metal, an inner lamination 218, and an outer lamination 219. A plurality of cavities such as cavity 226 are formed along the oven liner. Thus the inner lamination 218 is depressed inwardly (toward the oven) to form the inner half 222 of the heating unit sheath, and the outer lamination 219 is depressed outwardly to form the outer half 223 of the heating unit sheath. Thus for purposes of definition, one may consider the inner lamination 218 as the "oven liner" and the outer lamination 219 as a "channel member." An electric resistance element 234 is placed along the length of the cavity 226 and an electrical insulating material 236 is then poured into the remaining space within the cavity 226.

Figure 7:
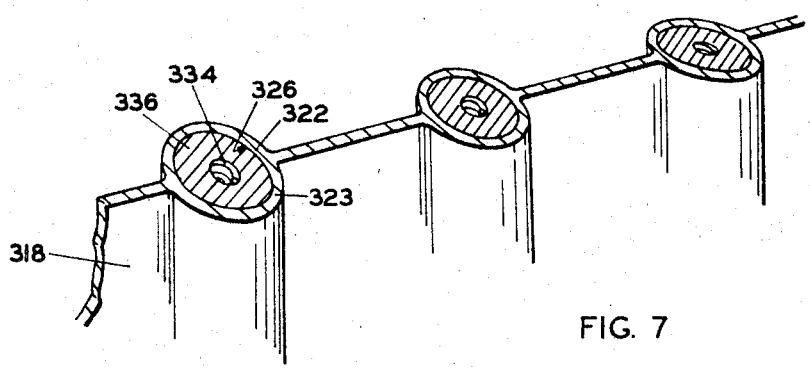
FIG. 7 is a fragmentary view in perspective of another embodiment of my invention.

FIG. 7 illustrates still another embodiment of the heating unit of my invention. The "sheath" of this heating unit may be formed by the "tube in sheet" process. As shown in FIG. 6, the oven liner wall 318 comprises a unitary body. A plurality of cavities, such as cavity 326 are formed along the oven liner. A portion of the oven liner is depressed inwardly to form the inner half 322 of the heating unit sheath. An outer portion of the oven liner is depressed outwardly to form the outer half 323 of the heating unit sheath. For purposes of definition, one may consider the inwardly bent portion as the "oven liner" and the outwardly bent portion as the "channel member." An electric resistance element 334 is placed along the length of the cavity 326 and an electrical insulating material 336 is then poured into the remaining space within the cavity.

Figure 8:
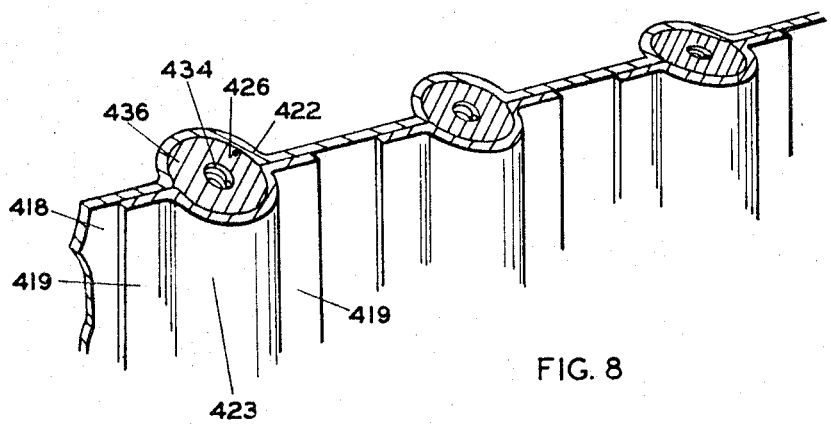
FIG. 8 is a fragmentary view in perspective of another embodiment of my invention.

FIG. 8 illustrates yet another embodiment of the heating unit of my invention. As shown in FIG. 8, the oven liner 418 is formed with a plurality of inward depressions such as depression 422. A channel member 423 having flanges 419 is connected to the oven liner 418 by any means desired. Thus a plurality of cavities such as cavity 426 are formed. An electric resistance element 434 is placed along the length of the cavity 426, and an electrical insulating material 436 is then poured into the remaining space within the cavity 426.

Figure 9:
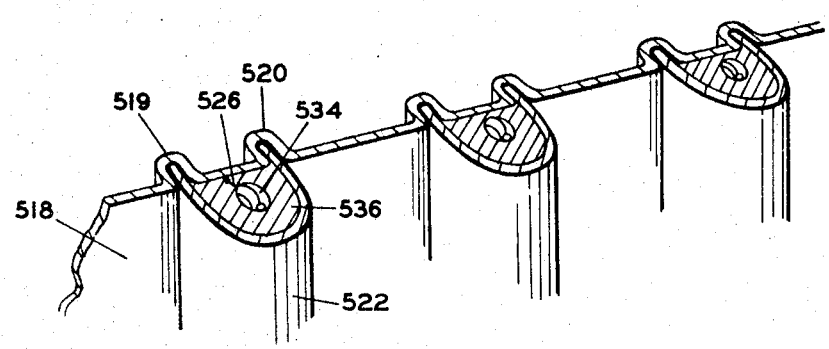
FIG. 9 is a fragmentary view in perspective of another embodiment of my invention.

FIG. 9 illustrates still another embodiment of the heating unit of my invention. As shown in FIG. 9, a portion of the oven liner 518 is formed into two narrow outwardly-facing channels (or inwardly facing fins) 519 and 520. The edges of a channel member 522 are inserted into the channels 519 and 520 to form a cavity 526 A resistance element 534 is positioned in the cavity 526 and insulation material 36 is placed in intimate contact with the resistance element 534. As shown, there is a substantial area of contact of the insulating material 536 and the oven liner 518.

Figure 10:
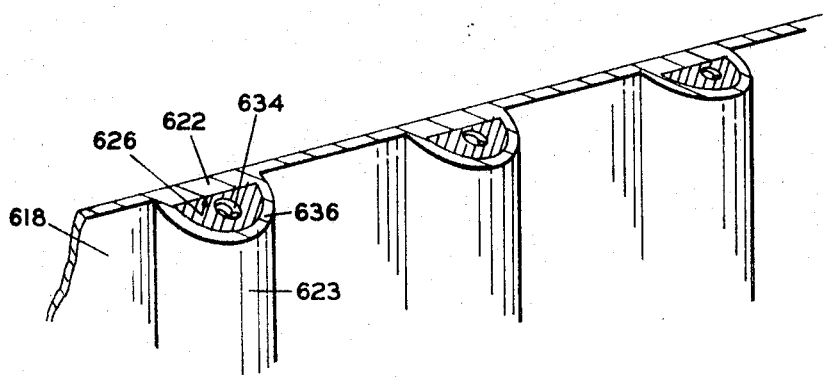
FIG. 10 is a fragmentary view in perspective of another embodiment of my invention.

FIG. 10 illustrates another embodiment of the heating unit of my invention. A generally tubular structure may be constructed, by rolling it for example, so that it has a longitudinal planar surface. The planar surface should be at least 10% of the total periphery of the tube. A planar surface of more than 30% and less than 50% of the total periphery gives the best results. This tubular structure is fused to the oven liner at the whole are of the planar surface. A thin sheet of cooper or bronze may be placed between the planar surface of the tube and the oven liner and then melted into both bodies. Thus the tubular structure and the oven liner become a unitary body. The oven liner may be considered as including the planar portion of the tube. As shown in FIG. 10, the oven liner 618 has a plurality of cavities such as cavity 626. The sheath of my heating unit may be described as formed by a U-shaped channel 623 and by the planar portion of the oven liner 622. An electric resistance element 634 is placed longitudinally within the cavity 626 and an electrical insulating material 636 occupies the remaining space within the cavity 626.

The embodiment shown in FIG. 10, is for some purposes, the most desirable embodiment for use with my cleaning process, and further appears to give excellent results when used with my manufacturing process.

It should be understood that in all of the embodiments of my invention the relationship of the structure could be inverted so that what has been considered as the "inside" surface of the oven could be the outside surface. Furthermore, it should be understood that all of the embodiments of my invention may be used not only for linear heating units on each separate panel of the oven linear but also for heating units which are curved in conformity with a curved oven liner portion.

Metal is the preferred material for construction of the oven liner and the remainder of the sheath portion of the several embodiments of my invention. Aluminum, because of its high thermal conducitvity and bendability is the preferred metal. Steel has desirable qualities and may also be used very effectively.

Because my invention is applicable to other devices, such as heat treating furnaces and kilns for example, it is to be understood that while the detailed drawings and specific examples given describe preferred embodiments of my invention they are for the purposes of illustration only, that the apparatus of the invention is not limited to the precise details and conditions disclosed, and that various changes may be made therein without departing from the spirit of the invention which is defined by the following claims.

I claim:

1. An oven heating unit comprising:
   (1) a portion of an oven liner;
   (2) a channel member attached to said linear portion in a manner to form a cavity between said channel member and said liner portion;
   (3) an electric resistance element for the supplying of heat, said element being positioned with in said cavity; and
   (4) an electrical insulating material intimately surrounding said resistance element and making a subsantial area of contact with said liner portion;
      whereby a substantial proportion of the heat flowing from said resistance element to said liner portion passes through said area; wherein said oven liner portion is formed with a pair of spaced parallel U-shaped fins in a manner to present to said channel member a pair of spaced parallel concavities; wherein said channel member is U-shaped, the legs of which channel U are spaced a distance substantially equal to the space between said concavities; and wherein one of the legs of said channel U is positioned in one said concavity and the other leg is positioned in the other said concavity.

2. An oven having an oven liner with a plurality of spaced parallel channel members attached thereto to form a plurality of cavities between said members and said liner, having a plurality of electrical resistance elements one in each of said cavities to provide heat for the oven, and having an electrically insulating material intimately surrounding each of the resistances elements and making a substantial area of contact with said liner;

a wall of said oven liner being provided with a flange extending perpendicularly from the edge of said liner, said flange being provided with notches at areas where a projection of said cavities would intersect said flange;

whereby said flange is notched to provide for the insertion of said resistance elements into said cavities.

3. An oven having an oven liner with a plurality of spaced parallel channel members attached thereto to form a plurality of cavities between said members and said liner, having a plurality of electrical resistance elements one in each of said cavities to provide heat for the oven, and having an electrically insulating material intimately surrounding each of the resistance elements and making a substantial area of contact with said liner;

said oven liner comprising a plurality of walls joined at their edges to form said oven liner wherein walls thereof are provided with flanges at their edges extending inwardly for attachment to other walls thereof.

4. A self cleaning cooking stove for the preparation of food including (a) an oven liner forming an enclosure for the baking of foods, the bottom of the oven liner having at least one opening;

(b) a gas burner positioned beneath the oven liner and operable so that heated gases produced by combustion at the burner flow into the enclosure through said opening for the supplying of heat to the liner by convection; and (c) an electric heater mounted directly on the liner wall for supplying of heat by conduction from the heater to the oven liner;

wherein accumulated deposits of food soils may be degraded, evaporated, or oxidized from a liner surface by sufficiently elevating its temperature by supplying heat to the oven liner simultaneously from said burner and said heater.

5. A stove according to claim 4, wherein the electric heaters comprise a plurality of parallel channel members thermally attached to the liner to from a plurality of cavities between the channel members and the liner, the oven liner having a plurality of electrical resistance elements, one in each of said cavities, and having an electrically insulating material intimately surrounding each of the resistance elements and filling the cavities.

6. A stove accordng to claim 4, wherein such electric heaters are thermally mounted to all sides and the top of the even liner and wherein a switching means is electrically connected to the heaters for sequentially energizing them.

References Cited

UNITED STATES PATENTS

| | | | |
|---|---|---|---|
| 2,035,757 | 3/1936 | Ottenstein | 219—407 |
| 2,777,300 | 1/1957 | Palmer | 29—611 |
| 3,032,861 | 5/1962 | Foster | 29—611 |
| 3,079,673 | 3/1963 | Loehlein et al. | 29—611 |
| 3,137,924 | 6/1964 | Wilkins | 29—611 |
| 3,336,465 | 8/1967 | Hurko | 219—543 X |
| 3,364,912 | 1/1968 | Dills et al. | |

BERNARD A. GILHEANY, Primary Examiner

H. B. GILSON, Assistant Examiner

U.S. Cl. X.R.

29—406; 126—121

UNITED STATES PATENT OFFICE
CERTIFICATE OF CORRECTION

Patent No. 3,465,125            September 2, 1

George McArthur, Jr.

It is certified that error appears in the above identified patent and that said Letters Patent are hereby corrected as shown below:

Column 7, line 72, "insulation material 36" should rea -- insulation material 536 --.

Signed and sealed this 21st day of April 1970.

(SEAL)
Attest:

Edward M. Fletcher, Jr.            WILLIAM E. SCHUYLER
Attesting Officer            Commissioner of Pa